United States Patent Office 3,297,735
Patented Jan. 10, 1967

3,297,735
PROCESS FOR THE PRODUCTION OF ETHERS OF HYDROXYMETHYL POLYMETHYL SILOXANES
Walter Simmler, Cologne-Mulheim, Germany, assignor to Farbenfabriken Bayer Aktiengesellschaft, Leverkusen, Germany, a corporation of Germany
No Drawing. Filed Mar. 12, 1964, Ser. No. 351,559
Claims priority, application Germany, May 24, 1960, F 31,298
7 Claims. (Cl. 260—448.2)

This application is a continuation-in-part of applicant's copending application Serial No. 111,476 filed May 22, 1961, now abandoned.

This invention relates to the production of alkyl and aryl ethers of hydroxymethyl polymethyl siloxanes as well as to the analogous ether-like compounds derived from oxygen-containing alkyl or aryl derivatives.

The production of alkoxyalkyl silicon compounds by the reaction of chloralkyl silicon compounds with sodium alcoholates has been described according to a Williamson-type of synthesis, or by the reaction of chlorosilicon compounds with chloralkyl ethers according to a Wurtz-type synthesis. In the first case only moderate yields have hitherto been attained, partly due to the well known fact that alkali metal alcoholates split siloxane compounds. The reaction according to Wurtz is more satisfactory as to yield, but, however, has the disadvantage that the metal-organic compounds used in the process can be handled only with difficulty.

It is the primary object of this invention to provide a process for the production of alkyl and aryl ethers of hydroxymethyl polymethyl siloxanes avoiding the disadvantages of the art both as to yields and reaction components. Other objects and advantages will be apparent from the following description.

The present invention is based on the discovery that, in contradistinction to chloralkyl silicon compounds, a bromomethyl siloxane can be reacted smoothly and directly with a hydroxyl compound with formation of an ether according to the following reaction equation:

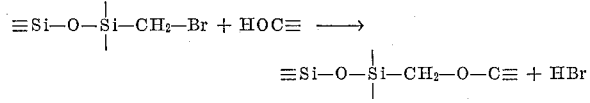

if for each gram-atom of bromine at least 1 gram-equivalent of a tertiary nitrogen base is introduced into the reaction in such a manner that this base is available to the bromine compound only in the presence of the second etherification component.

The process according to the invention is carried out by reacting at elevated temperatures an aliphatic or aromatic hydroxyl compound with a bromine-substituted methyl polysiloxane of the general formula

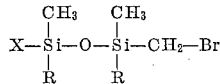

and a tertiary nitrogen base, using per gram-atom of bromine at least 1 gram-equivalent of the hydroxyl compound and the nitrogen base. In the above formula R represents methyl or the optionally recurring siloxane unit

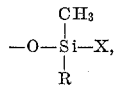

and in either of the above formulae X designates the radical Br—CH$_2$— or the radical R in the meaning just defined.

Examples of hydroxyl compounds suitable for use as the second etherification component are monohydric or polyhydric alcohols and mono- and polyphenols, such as, for instance, butanol, glycol, allyl alcohol, phenol or resorcinol, ether alcohols such as poyalkylene glycols, as for instance, dipropylene glycol, and their monoethers, for example polyethylene propylene glycol monoether, ester alcohols, hydroxycarboxylic acid esters, such as glycollic acid alkyl esters and salicyclic acid alkyl esters as for instance salicylic acid ethyl ester.

Examples of tertiary bases suitable for use in the process of the invention include triethylamine, benzyl dimethylamine, hexamethylenetetramine, pyridine, etc.

The use of a solvent is not necessary in many cases. If a solvent is used, it is advantageous to select an inert liquid boiling above 50° C. such as for example benzene, toluene, xylene, or diisopropyl-benzene. With some reactants, the reaction proceeds with evolution of considerable heat following the start up of the reaction by initial heating. The mixing of the reaction components is then preferably carried out in small portions during the reaction by either slowly adding the nitrogen base to a mixture of the methyl-bromomethyl siloxane and the hydroxyl compound, or slowly adding a mixture of the nitrogen base and the hydroxyl compound to the methylbromomethyl siloxane.

The siloxanylmethyl ethers produced according to the invention are suitable as intermediates for modifying oils, elastomers and resins of organo-polysiloxanes and as surface-active agents characterized by an outstanding heat resistance, they have the advantage that the siloxane component is bound to the purely organic component, by a linkage which is stable to hydrolysis. This circumstance is most important in cases in which the organic part of the ether imparts water-solubility to the resulting material.

The following examples are illustrative only and should not be construed as limiting the invention which is properly delineated in the appended claims.

Example 1

To a mixture boiling under reflux and consisting of 100 cc. of toluene, 48.2 g. of pentamethyl monobromomethyl disiloxane and 14.8 g. of n-butanol, there are added dropwise in the course of 3 hours 17 cc. of pyridine. The precipitated salt is filtered off, and the filtrate distilled. As a fraction going over at 175° C. following the solvent, the pentamethylmono-(n-butoxymethyl)-disiloxane is obtained as a water-clear, easily flowing liquid whose refractive index $n_D^{20}$ is 1.4000.

The filter residue is completely water-soluble producing with silver nitrate a bromide reaction and upon heating with potassium hydroxide solution the pyridine odor.

Example 2

A mixture of 32 g. of 1,3-di(bromomethyl)-1,1,3,3-tetramethyl disiloxane and 15 g. of n-butanol is heated to 100° C. and 15 g. of pyridine are then added dropwise in portions in the course of 30 minutes. The initially clear solution becomes turbid and a pale brown solid substance is separated out. The solution is filtered and a clear water-insoluble oil, the 1,3-di(n-butoxymethyl)-1,1,3,3-tetramethyl disiloxane, is obtained as filtrate.

Example 3

To a mixture boiling under reflux and consisting of 100 cc. of o-xylene, 100 g. of a polymer-homologue siloxane mixture of the formula

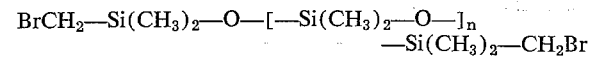

wherein the mean value of $n$ amounts to 11.7, and 9.8 g. of allyl alcohol, there are added dropwise in the course of 3 hours 20 cc. of pyridine. The mixture is filtered, the o-xylene distilled off from the filtrate and the latter is blown out with nitrogen at 150° C./30 mm. Hg. An allyl ether of the formula

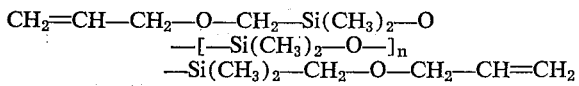

remains as a bromine-adding oil whose refractive index $n_D^{20}$ is 1.4115.

Example 4

To a mixture boiling under reflux and consisting of 100 cc. of o-xylene, 100 g. of a siloxane of the formula

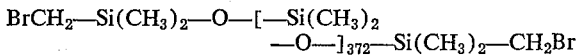

and 1 g. of allyl alcohol, there are added dropwise in the course of 5 hours 5 cc. of pyridine. The process is further carried out as described in Example 3, and the analogous allyl ether is obtained as a bromine-adding oil whose refractive index is $n_D^{20}$ 1.4068.

Example 5

A mixture of 40 g. of a methyl-bromomethyl-polysiloxane of the composition

and 100 g. of a polyethylene propylene glycol monoethyl ether having a hydroxyl number of 37 is heated to 180° C., and 10 g. of benzyl-dimethylamine are then added with stirring in the course of 20 minutes, and the reaction mixture is kept at 180° C. for a further 3 hours. The initial emulsion of the reaction components precipitates a solid bottom deposit as described in the preceding examples; in addition, an insignificant quantity of the starting siloxane remains upon standing as a layer floating on the reaction product. After separation and filtration, an oil is obtained of the composition

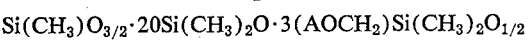

wherein AO denotes the radical of the polyglycol monoethyl ether used.

Example 6

In Example 5, the benzyl dimethylamine is replaced by 6 g. of pyridine, but otherwise proceeding as described therein. The main reaction product having the same composition has a refractive index $n_D^{20}=1.4483$ and contains 9.2 percent by weight of silicon.

Example 7

To a mixture of siloxane and glycol ether as described in Example 5, 100 cc. of toluene are added, otherwise proceeding at boiling temperature as described therein. In this case the precipitated hydrobromide can be filtered off more easily. The filtrate is freed from toluene by evaporation. The same oil as that obtained in Example 5 is recovered.

Example 8

A mixture of 200 g. of the same methyl bromomethyl polysiloxane as that described in Example 5, 55 g. of salicylic acid ethyl ester and 46 g. of benzyl dimethylamine is heated with stirring. Upon reaching a temperature of 80° C. the reaction mixture begins to become turbid and to precipitate a salt. The mixture is heated for a total of 3 hours at a temperature between 170 and 190° C. and finally filtered. As filtrate, the etherification product is obtained in the form of a yellow oil having a refractive index $n_D^{20}=1.4380$. The filter residue amounts to 70 g. as against the stoichiometrically calculated amount of 73 g. for benzyldimethyl hydrobromide.

Example 9

In an analogous manner to that of Example 2, the process is carried out by heating to 100° C. a mixture of 32 g. of 1,3-di-(bromomethyl)-1,1,3,3-tetramethyl disiloxane and 27 g. of dipropylene glycol, and adding dropwise 15 g. of pyridine in the course of 30 minutes. As filtrate, there is obtained a polymer of recurring units of the formula

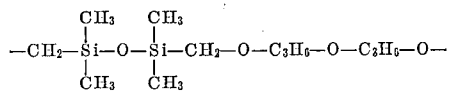

in the form of a viscous oil.

Example 10

To a mixture of 400 cc. of o-xylene, 302 g. of a methyl bromomethyl polysiloxane of the composition

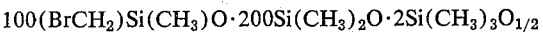

and 67 g. of dipropylene glycol, there are added dropwise at 140° C. in the course of 6 hours, 80 cc. of pyridine. The mixture is filtered, the o-xylene is distilled off from the filtrate and the latter is blown out with nitrogen at 150° C./30 mm. Hg. There remains a product which is resin-like in the cold.

Example 11

To a mixture of 200 cc. of o-xylene, 106 g. of a siloxane of the formula

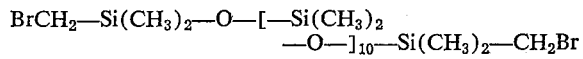

and 65 g. of an esterification product of equimolar amounts of phthalic acid, trimethylol propane and ethylene glycol, whose OH number is 410, there are added dropwise at 140° C. in the course of 4 hours 17 cc. of pyridine. The operation is further carried out as described in Example 10, and a highly viscous product is obtained.

Examples 12–23

In the following the production of compounds is described in which a diol, briefly designated by HO(G)OH, is etherified at one end only so that the reaction product contains a free hydroxyl group in the molecule according to the general formula

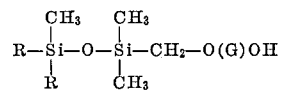

wherein —O(G)OH stands for the radical of the diol selected in each case (R having the meaning set out above).

In the following table there denote, in accordance with known symbols for siloxane units, M'D$_x$M' in Examples 12 to 20:

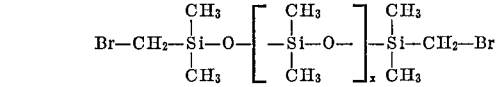

TD$_x$M'$_3$ in Examples 21 to 23 the composition

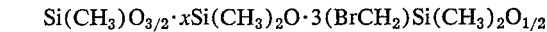

The figures given for $x$ are mean values of the chain lengths. The molecular weight of the polyethylene oxide in Example 14 amounts to approximately 600, that of the propylene oxide in Examples 17, 20 and 23 approximately 270.

The equimolar mixture of a bromine-substituted methyl polysiloxane and diol indicated in each case in the first column of the table, which contains, before the reaction begins, twice as many hydroxyl groups as bromine atoms, is mixed with an equal volume of o-xylene. The solution thus obtained is heated under reflux and the amount of pyridine indicated in the table for each case is added dropwise during the time as indicated. The precipitated pyridinium bromide is then filtered off from the solution, and the solvent removed from the filtrate first by distillation and then by blowing out with nitrogen at 150° C./30 mm. Hg. In the last columns of the table refractive index $n_D^{20}$, density (g./cc.) and viscosity (cp.) are listed of each of the siloxane-substituted ether alcohols remaining in the liquid state. These products are especially suitable for further conversions due to their alcoholic hydroxyl groups.

| Example | Etherification components | Pyridine | $n_D^{20}$ | Density | Viscosity |
|---|---|---|---|---|---|
| 12 | 1,765 g. M'D$_{10.5}$M'+290 g. 1,3-dihydroxybutane | 300 cm.³ in 6 hours | 1.4123 | 0.985 | 48.5 |
| 13 | 500 g. M'D$_{10.5}$M'+122 g. dipropyleneglycol | 100 cm.³ in 6 hours | 1.4143 | 0.986 | 53.2 |
| 14 | 254 g. M'D$_{10.2}$M'+283 g. polyethylene oxide | 60 cm.³ in 4 hours | 1.4418 | 1.058 | 965 |
| 15 | 500 g. M'D$_{104}$M'+11.6 g. 1,3-dihydroxybutane | 25 cm.³ in 2 hours | 1.4064 | 0.975 | 460 |
| 16 | 500 g. M'D$_{104}$M'+16.8 g. dipropyleneglycol | do | 1.4068 | 0.977 | 490 |
| 17 | 500 g. M'D$_{90}$M'+38.8 g. polypropylene oxide | do | 1.4079 | 0.975 | 714 |
| 18 | 500 g. M'D$_{305}$M'+3.9 g. 1,3-dihydroxybutane | 15 cm.³ in 3 hours | 1.4100 | 0.970 | 721 |
| 19 | 500 g. M'D$_{305}$M'+5.9 g. dipropyleneglycol | do | 1.4064 | 0.970 | 800 |
| 20 | 500 g. M'D$_{305}$M'+11.8 g. polypropylene oxide | do | 1.4079 | 0.970 | 1,520 |
| 21 | 500 g. TD$_{20.1}$M'$_3$+65.8 g. 1,3-dihydroxybutane | 60 cm.³ in 7 hours | 1.4125 | 0.980 | 200 |
| 22 | 500 g. TD$_{20.1}$M'$_3$+98.4 g. dipropyleneglycol | 65 cm.³ in 7 hours | 1.4142 | 0.980 | 230 |
| 23 | 186 g. TD$_{17.7}$M'$_3$+81.0 g. polypropylene oxide | 35 cm.³ in 7 hours | 1.4204 | 0.980 | 450 |

*Example 24*

To a mixture of 100 g. of a siloxane of the formula

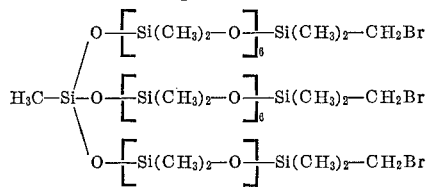

containing 10.9 percent by weight of bromine, and 183.5 g. of a polyethylenepropyleneglycol monobutylether having a hydroxyl number of 41.5, and 600 cc. of o-xylene, there are added 19 g. of hexamethylenetetramine. This suspension is heated under reflux for 8 hours, filtered afterwards and the solvent is distilled from the filtrate. The residue is freed from volatiles by heating to 110° C. and passing nitrogen at 15 mm. Hg through the residue. There remains a polyetherpolysiloxane as a homogeneous water soluble oil having a viscosity of 781 cp. at 20° C.

*Example 25*

A mixture of 160 g. of 1,3-di-(bromomethyl)-tetramethyl disiloxane, 250 cc. o-xylene and 91 g. of mannite is heated under reflux while 111 g. of triethylamine are added dropwise in the course of 10 hours. There is a visible decrease in the amount of mannite while triethylammonium bromide is precipitated. Boiling under reflux is continued for additional 8 hours. Upon cooling the solid reaction products settle at the bottom of the flask, the liquid phase is separated by decanting and freed from volatiles by heating to 80° C. under reduced pressure, finally at 0.4 mm. Hg. The residual condensation product has a composition corresponding approximately to a polymer of recurring units of the formula —CH$_2$—Si(CH$_3$)$_2$—O—Si(CH$_3$)$_2$—CH$_2$
—O—CH$_2$[CH(OH)]$_4$CH$_2$—O—

*Example 26*

A solution of 48 g. of phenol and 51 g. of triethylamine in 300 cc. o-xylene is heated under reflux while 80 g. of 1,3-di-(bromomethyl)-tetramethyl disiloxane are added dropwise in the course of 4 hours. Triethylammonium bromide is precipitated as a crystalline solid, also there is separated a heavy liquid phase essentially consisting of impure triethylammonium bromide. Boiling under reflux is continued for additional 6 hours. Upon cooling solids and a heavy liquid phase settle at the bottom of the flask. The upper phase is separated by decanting. From this material the solvent is distilled under reduced pressure and the residue fractionated in vacuo. There is obtained 1,3-di-(phenoxymethyl)-tetramethyl disiloxane as a colourless clear liquid having a boiling point of 150 to 153° C. at 0.35 mm. Hg and a refractive index $n_D^{20}=1.4950$.

*Example 27*

To a mixture boiling under reflux and consisting of 400 cc. of o-xylene, 21.8 g. of pyrocatechol and 100 g. of a polymer-homologue siloxane mixture of the formula BrCH$_2$—Si(CH$_3$)$_2$—O[Si(CH$_3$)$_2$
—O]$_n$Si(CH$_3$)$_2$—CH$_2$Br wherein the mean value of $n$ amounts to 9.4, there are added dropwise in the course of 8 hours 20 g. of triethylamine. Boiling under reflux is continued for another 8 hours, the mixture is filtered and the solvent is distilled from the filtrate. The residue is freed from volatiles by heating to 110° C. and passing nitrogen through the residue under a pressure of 15 mm. Hg. As the etherification product there remains an oil of 48 cp. viscosity, having a refractive index $n_D^{20}=1.4256$.

*Example 28*

To a mixture boiling under reflux and consisting of 1.5 litres of o-xylene, 268 g. of dipropylene glycol and 1000 g. of a polymer-homologue siloxane mixture of the formula BrCH$_2$—Si(CH$_3$)$_2$—O[Si(CH$_3$)$_2$
—O]$_n$Si(CH$_3$)$_2$—CH$_2$Br wherein the mean value of $n$ amounts to 9.4, there are added dropwise in the course of 10 hours 202 g. of triethylamine. Heating under reflux is continued for additional 4 hours, followed by filtration. The solvent is distilled from the filtrate leaving a residue which is freed from volatiles by passing nitrogen through the residue. The etherification product remains as an oil having a viscosity of 69 cp. at 20° C. and a refractive index $n_D^{20}=1.4144$.

What is claimed is:

1. A process for preparing an ether of a hydroxymethyl polymethyl siloxane which comprises reacting together an aliphatic compound selected from the group consisting of monohydric alcohols, polyhydric alcohols, ether alcohols, ester alcohols and esters of aliphatic hydroxycarboxylic acids with a bromine-substituted methyl polysiloxane of the formula

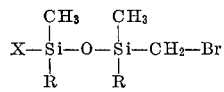

wherein X represents a member selected from the group consisting of methyl, Br—CH$_2$— and

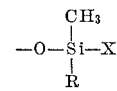

and R represents a member selected from the group consisting of methyl and

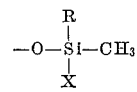

wherein X and R are defined as hereinabove and a tertiary nitrogen base selected from the group consisting of triethylamine, benzyl dimethylamine, hexamethylenetetramine, and pyridine, at a temperature above 50° C. using for each gram atom of bromine at least one gram equivalent of said hydroxyl compound and at least one gram equivalent of said tertiary nitrogen base.

2. Process according to claim 1 wherein said tertiary nitrogen base is triethylamine.

3. Process according to claim 1 wherein said tertiary nitrogen base is benzyl-dimethylamine.

4. Process according to claim 1 which comprises effecting said reaction in the presence of an inert solvent.

5. Process according to claim 1 wherein said hydroxyl compound is a polyethylene propylene glycol monoethyl ether and said tertiary nitrogen base is benzyl-dimethylamine.

6. Process according to claim 1 which comprises heating a mixture of the bromine-substituted methyl polysiloxane with the entire amount of hydroxyl compound and thereafter slowly adding to the mixture the nitrogen base.

7. Process according to claim 6 which comprises effecting said reaction in the presence of an inert solvent.

References Cited by the Examiner

UNITED STATES PATENTS

| | | | |
|---|---|---|---|
| 2,770,631 | 11/1956 | Merker | 260—448.2 |
| 2,833,802 | 5/1958 | Merker | 260—448.2 |
| 2,846,458 | 8/1958 | Haluska | 260—448.2 |

OTHER REFERENCES

Andrianov et al.: Izvestia Akad. Nauk. SSSR (1959) pp. 450–459.

TOBIAS E. LEVOW, *Primary Examiner.*

HELEN McCARTHY, *Examiner.*

E. C. BARTLETT, J. G. LEVITT, *Assistant Examiners.*